United States Patent [19]

Habisohn

[11] 3,716,770
[45] Feb. 13, 1973

[54] SLOW START-STOP MOTOR CONTROL SYSTEM

[75] Inventor: Victor J. Habisohn, Hoffman Estates, Ill.

[73] Assignee: Reliamatic, Inc., Chicago, Ill.

[22] Filed: April 20, 1970

[21] Appl. No.: 29,869

[52] U.S. Cl. .................................318/259, 318/431
[51] Int. Cl. .............................................H02m 1/18
[58] Field of Search......318/203, 227, 258, 259, 210, 318/373, 431, 416; 317/11 A; 307/136

[56] References Cited

UNITED STATES PATENTS

| | | |
|---|---|---|
| 3,045,163 | 7/1962 | Collom ............................318/416 X |
| 3,430,122 | 2/1969 | Krabbe et al. .........................318/203 |
| 3,421,070 | 1/1969 | Ettinger.................................307/136 |

Primary Examiner—Bernard A. Gilheany
Assistant Examiner—W. E. Duncanson, Jr.
Attorney—Robert L. Slater, Jr. and Jerome Goldberg

[57] ABSTRACT

A solid state motor control system including means for providing a slow motor start by increasing torque at a slow rate until full torque is reached which corresponds to full speed, and a slow motor stop by increasing counter motor torque at a slow rate until the motor approaches zero speed.

36 Claims, 29 Drawing Figures

PATENTED FEB 13 1973

INVENTOR
VICTOR J. HABISOHN

BY Robert L. Slater, Jr.
ATTORNEY

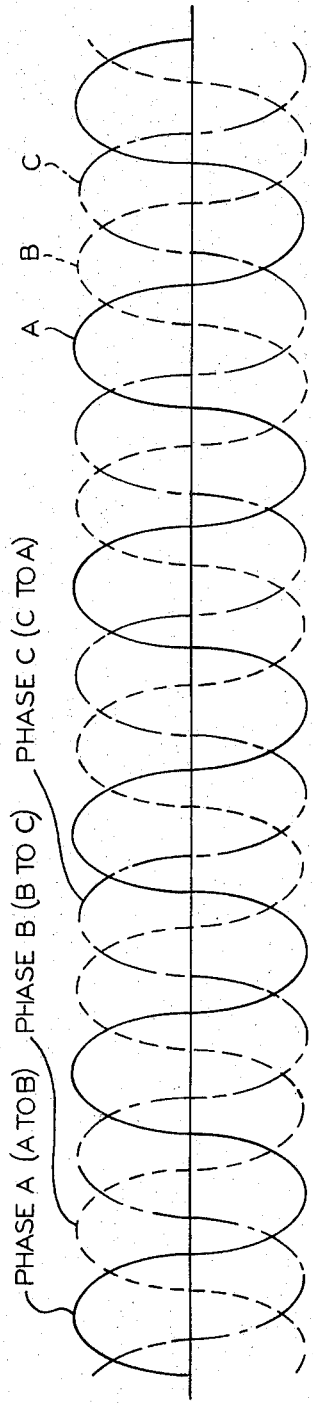
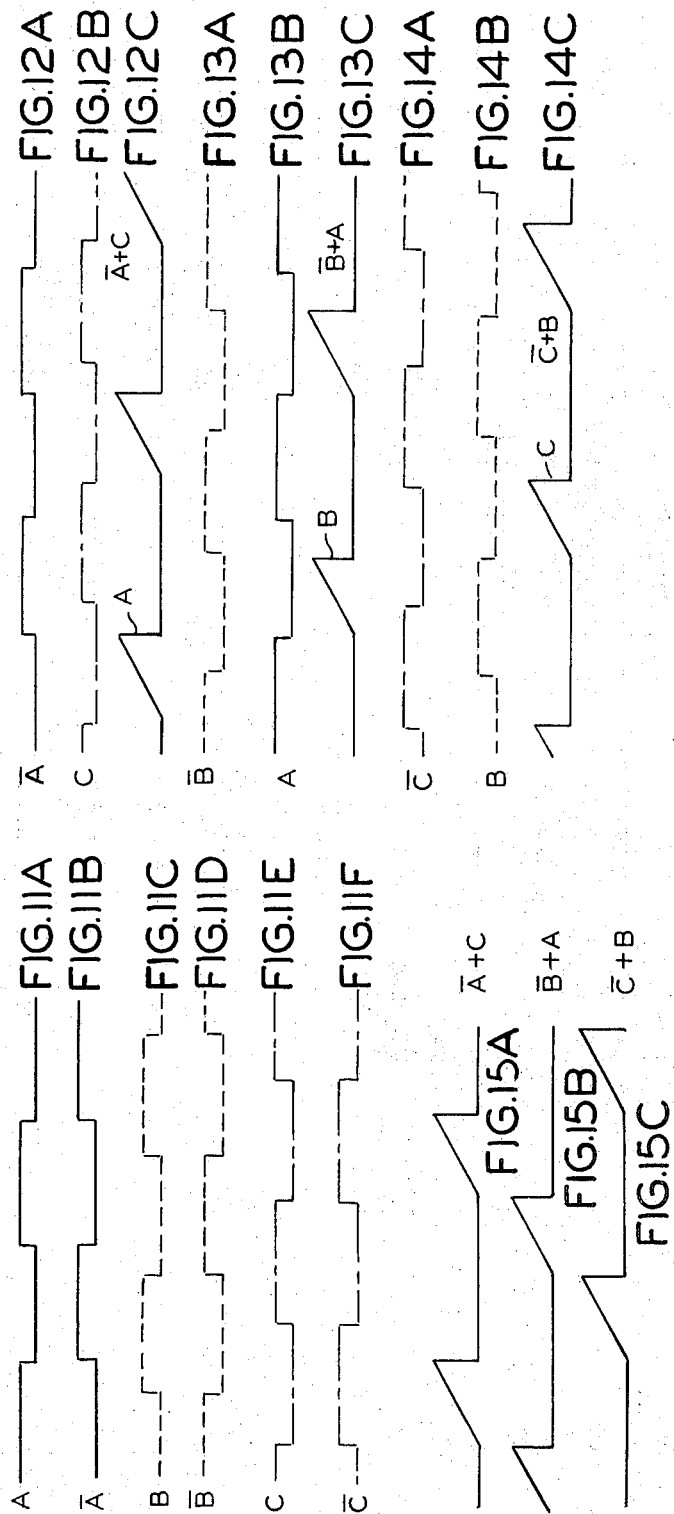

SLOW START-STOP MOTOR CONTROL SYSTEM

BACKGROUND OF THE INVENTION

The invention relates generally to a control system for driving an alternating current (AC) motor and more particularly relates to a solid state slow start and stop control system for an induction motor. Still more particularly, the invention relates to a slow start and stop control system suitable for use with an overhead industrial horizontal trolley and crane system.

Normally, overhead horizontal industrial motorized trolleys which include a crane or hoist assembly, convey loosely packaged materials and sometimes even smoldering liquids from one location to another. In order to prevent damage and loss of materials being transported or injury to personnel, it is imperative that the trolley movement be relatively smooth and free of swing or "jerking action."

Generally, in the AC motor driven trolleys systems previously used, either a resistor, a reactor or an autotransformer was inserted in series with the motor input power leads to reduce starting voltage and to cause a delay in the motor reaching full speed. Similarly, these elements produced a delay upon stopping or reducing the speed of the motor. In this manner, the transition from zero speed to full speed or from full speed to zero speed was achieved smoother than without the use of such delay elements. The subject invention, however, replaces these delay elements and their respective associated circuitry with a solid state motor control means that substantially improves smoothness and control of motor operation as speed is increased from zero to full speed, or from full speed to zero speed.

It is contemplated that the principles, and substantial parts of the circuitry of the subject invention are suitable and adaptable for use with other type systems, particularly those systems that require a slow rate of increase and decrease of electrical energy, such as hoists, cranes, ground level conveyors, etc.

SUMMARY OF THE INVENTION

The slow-start-stop motor control system of this invention includes means, upon starting the motor, to increase torque gradually and then to accelerate the rate of torque increase until "full" torque is finally reached, which corresponds to "full" speed. Upon stopping the motor, a counter torque is gradually applied and then the rate of increase of the counter torque is accelerated until the system approaches a substantially zero torque condition; at which time the electrical power may be disconnected without causing any sudden "jerking" when the trolley completely stops.

The motor control system comprises a static switching network, for selectively transferring electrical power from an alternating current (AC) power source to an AC motor, such as the conventional induction motor. The switching network includes a plurality of thyristor switches, each having an off-condition and a conduction-condition. An operational control means controls the sequence of firing and the "on" time of the thyristor switches. After the system is started or after reversing the operation of the system, the control means provides a first signal of varying magnitude during a first time period to cause a gradual increase in the rate of electrical energy per electrical input power cycle being transferred through the switching network to the motor means; which, in turn, causes the motor torque to gradually increase. The control means during a second time period following the first period provides a second signal of varying magnitude, the rate of variation being greater than the first signal, to substantially increase the rate of electrical energy per power cycle being transferred through the switching network; and thereby accelerating the rate of torque increase until "full" torque is reached.

A contactor means is connected between the power source and the static switching network and includes manually controlled electromechanical switch means for connecting and disconnecting electrical voltage to the switching network.

The operational control means further comprises a delay means which generates an inhibit signal at substantially the instant the aforesaid electromechanical switch means connects electrical power to the switching network to prevent the static switches of the switching network from switching from the off to the conduction condition. This prevents the transfer of electrical power to the motor means for a predetermined time period. In this manner, a high impedance is presented across the contactor means to suppress or minimize electrical arcing when the contactor means connects the AC electrical power to the system. Thus, voltage is first switched into the system by the contactor means and thereafter current is switched into the motor means by the static switching network.

The motor control system also includes a break-arc suppressor means which also generates an inhibit signal to prevent the static switches of the switching network from switching from the off to the conduction condition when the contactor means is switched to "off" but prior to the disconnection of electrical AC power from the system. In this manner a high impedance is also presented across the contactor means to suppress or minimize electrical arcing, when the contactor means disconnects the AC electrical power from the system. Hence, current conduction to the motor means is switched "off" initially by the switching network and then the voltage to the system is disconnected by the contactor means. Therefore, the motor control system is completely separated from the power source when the contactor means disconnects the power.

Accordingly, it is a primary object of the invention to provide a motor control system that smoothly increases motor torque until the motor operates at full torque, after the system is first started and to smoothly apply motor counter torque in order to stop the motor. A related primary object is to provide a motor control system that smoothly increases motor speed until the motor operates at full speed, after the system is initially started.

Another object is to gradually increase torque and then accelerate the rate of torque increase until the motor operates at full torque, after the system is initially started and to gradually increase counter torque and then to accelerate the rate of counter torque increase until the motor reaches substantially zero torque, prior to fully stopping the motor by disconnecting the power to the system.

Another object is to provide means to prevent or reduce electrical arcing when AC electrical power is connected and disconnected from the system.

Another object is to control three-phase power inputs to a three-phase motor means in either the forward or reverse directions.

Still another object is to provide balanced input currents in each phase of the motor means independently of the electrical phase rotation of such currents.

Still another object is to completely disconnect the motor control system from the AC power source when the manual switches, which control the movement of the system, are released or de-activated.

Still another object is to provide a system for slowly increasing electrical energy transferred from an AC source to a load after the system is turned "on," and to slowly decrease the electrical energy transferred from the source to the load just prior to turning the system "off."

BRIEF DESCRIPTION OF THE DRAWINGS

Referring to the drawings in which the same characters of reference are employed to indicate corresponding similar parts throughout the several figures of the drawings:

FIG. 10 illustrates the three-phase sine wave voltage curves from points A to B, B to C and C to A when the forward contactor switches have been activated to connect lines L1, L2 and L3 with the points A, B and C.

FIGS. 11a to f illustrate the square wave output signals of the phasing networks referenced with respect to the three-phase sine wave voltage curves in FIG. 11;

FIG. 11a — output A; FIG. 11b — output $\bar{A}$;
FIG. 11c — output B; FIG. 11d — output $\bar{B}$;
FIG. 11e — output C; FIG. 11f — output $\bar{C}$.

FIGS. 12a, b and c illustrate the input and output signals of ramp gate A referenced with respect to FIG. 10;

FIG. 12a — input $\bar{A}$; FIG. 12b — input B; and
FIG. 12c — output $\bar{A}$ + B (ramp A).

FIGS. 13a, b and c illustrate the input and output signals of ramp gate B referenced with respect to FIG. 10;

FIG. 13a — input $\bar{B}$; FIG. 13b — input A; and
FIG. 13c — output $\bar{B}$ + A (ramp B);

FIGS. 14a, b and c illustrate the input and output signals of ramp gate C referenced with respect to FIG. 10;

FIG. 14a — input $\bar{C}$; FIG. 14b — input B; and
FIG. 14c — output $\bar{C}$ + B (ramp C);

FIGS. 15a, b and c illustrate the output ramp signals A, B and C when the reverse contactor switches have been activated to connect lines L3, L2 and L1 with points A, B and C (CBA phase rotation).

FIG. 15a — output $\bar{A}$ + C (ramp A);
FIG. 15b — output $\bar{B}$ + A (ramp B); and
FIG. 15c — output $\bar{C}$ + B (ramp C).

DESCRIPTION OF THE PREFERRED EMBODIMENT

Figure 1:
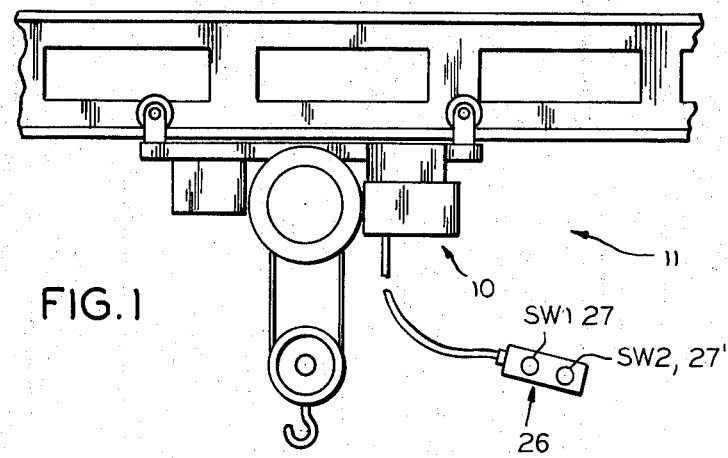
FIG. 1 is a front view of an overhead horizontal trolley system including a slow-start-stop motor control system, embodying the principles of the invention herein.
Figure 2:
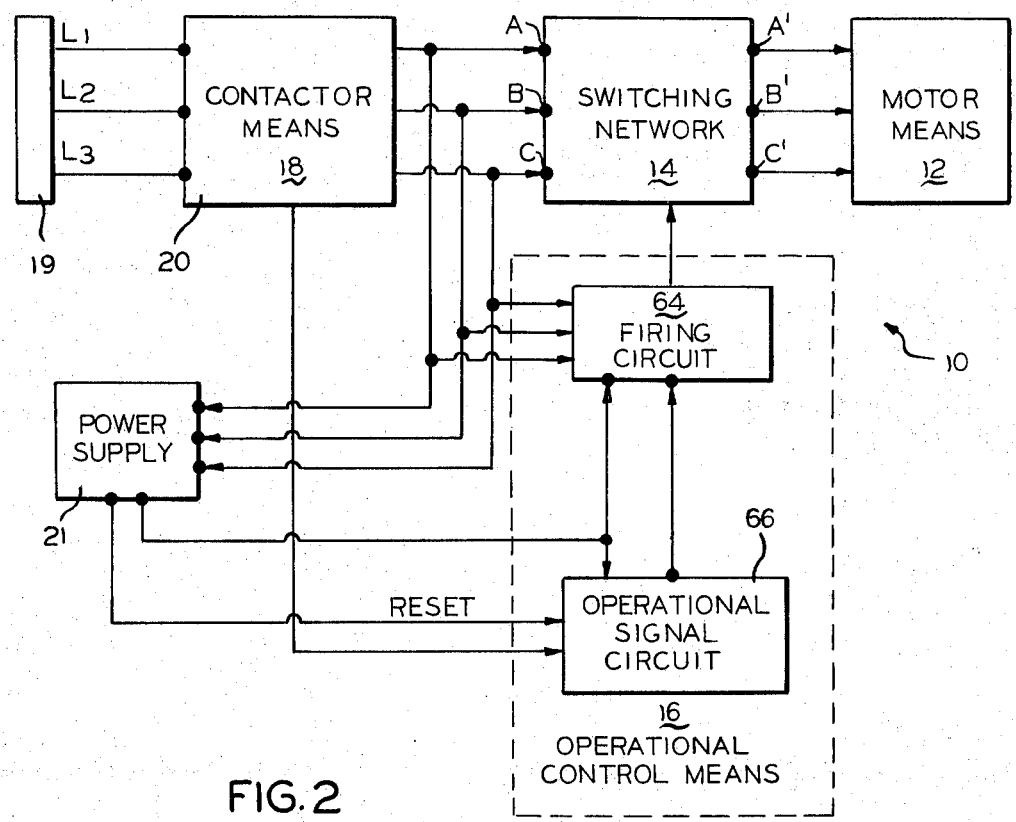
FIG. 2 is a block diagram of the slow-start-stop motor control system.
Figure 5:
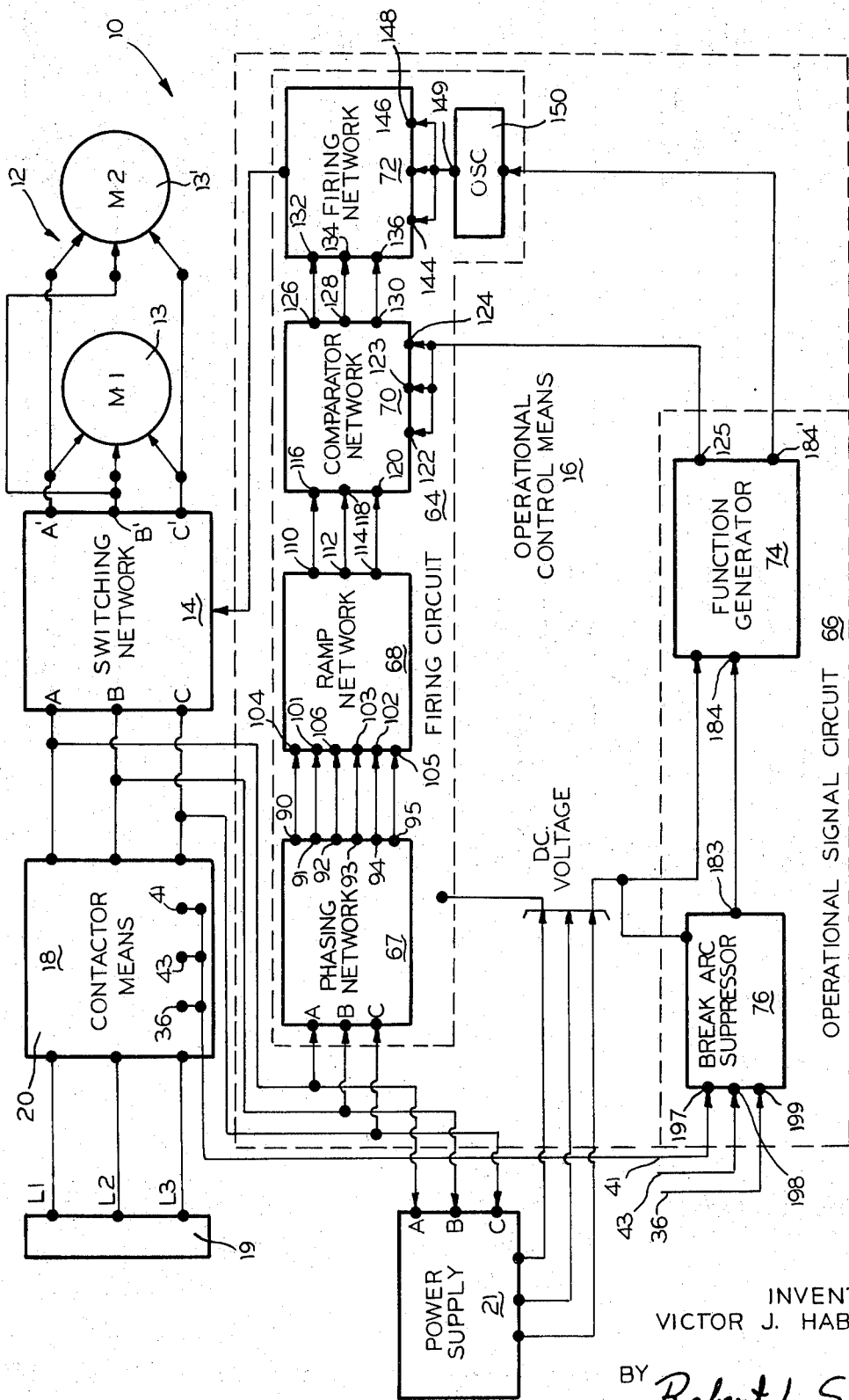
FIG. 5 is a more detailed block diagram of the motor control system.

Referring now particularly to FIGS. 1, 2 and 5 of the drawings, the reference numeral 10 indicates generally a slow-start-stop motor control system suitable for driving a horizontal trolley 11 (FIG. 1). The system 10 comprises a three-phase motor means 12 linked to a static switching network 14. The motor means 12 may be a single induction motor M1,13 or the motor M1,13 and a second induction motor M2,13' in parallel (FIG. 5). An operational control means indicated generally by the reference numeral 16 converts command signals received from a manually operated mechanical forward-reverse contactor means 18 at points A, B and C, into control signals for selectively controlling the electrical energy transferred by the switching network 14 to the motor means 12.

A polyphase alternating current (AC) power source 19 is connected to the input end 20 of the contactor means 18. Lines L1, L2 and L3 comprise the three-phase input power lines. A substantially balanced three-phase, 240 or a 480 volts AC, 60 Hertz system, are acceptable power sources. The proper phase relationship between lines L1, L2 and L3 must be maintained to provide controlled and repeatable operation of system 10.

A power supply 21 provides the direct current (DC) power for the operational control means 16. Power supply 21 receives AC input voltage from points A, B and C, and therefore is only "on" for the period that the contactor means is activated.

Figure 8A:
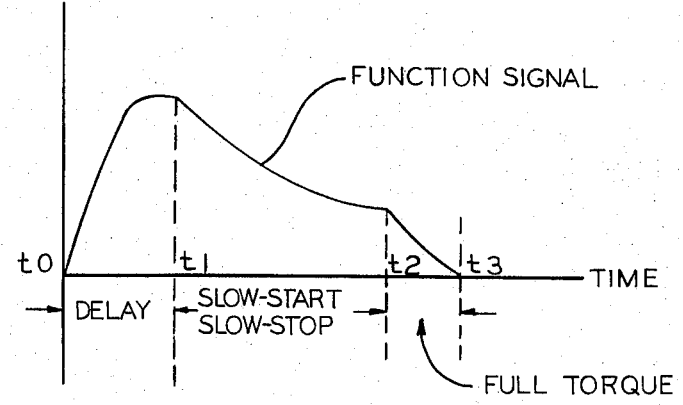
FIG. 8a is a curve of voltage versus time of the output function signal generated by the function generator.
Figure 8B:
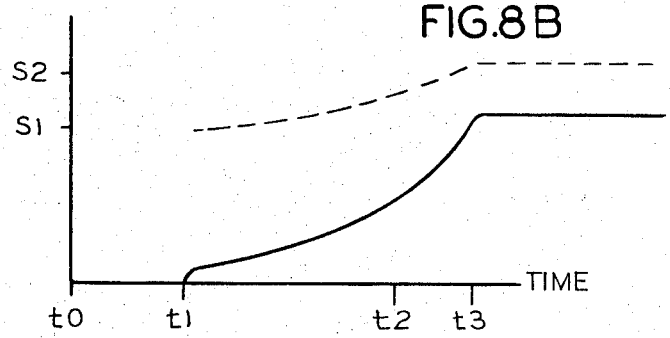
FIG. 8b is a curve of torque-speed versus time of the motor means when the motor means is started or counter torque is applied to stop or reverse rotation.

After initially starting system 10 there is a delay period prior to the commencement of the operation of the motor means 12. After the delay period, the torque acting on the motor means 12 gradually increases from an initial preset torque until reaching a predetermined torque level; and then the torque is increased at a substantially accelerated rate until "full" torque is finally reached. In the slow-start feature of the system, full torque corresponds to "full" speed. Referring to FIGS. 8a and 8b, the delay period extends from a time t0 to a time t1; the gradual build-up of torque from the initial torque occurs from the time t1 to a time t2, and the accelerated rate of torque increase occurs between the time t2 and a time t3. Full torque is generally reached between time t2 and t3. The system continues to operate at full torque until rotation of the motor means is reversed.

To stop or reverse the rotation of motor means 12, a counter torque is gradually applied to slowly reduce the speed of the motor means, until the motor means is at substantially zero speed (zero torque). At that time, the electrical power may be disconnected to completely stop the motor; or in the alternative, the counter torque may be permitted to accelerate and cause reversal of the motor rotation. FIGS. 8a and 8b also illustrate the sequence for slowly increasing counter torque until "-full" counter torque is reached, which corresponds to substantially zero speed.

CONTACTOR MEANS

Figure 3:
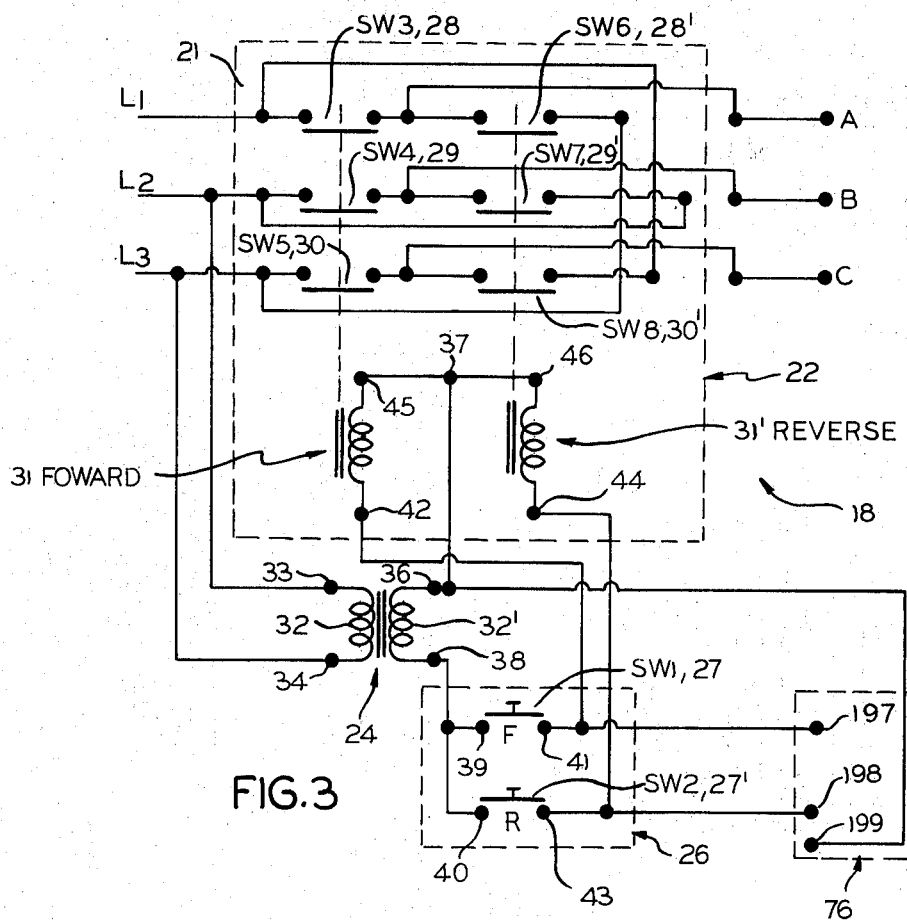
FIG. 3 is a schematic of the contactor means of the motor control system.

As shown in FIG. 3, the contactor means 18 comprises a three-phase contactor section 22, a transformer 24 and a push-button pendant assembly section 26 (FIG. 1). The pushbutton pendant assembly section 26 includes a manually controlled forward-pushbutton switch SW1,27 and a manually controlled reverse-pushbutton switch, SW2,27'.

The contactor section 22 comprises line switches SW3,28, SW4,29 and SW5,30 which connect respectively source power lines L1, L2 and L3 to points, A, B and C, upon activation of forward coil 31, to provide motor rotation in one direction, such as in the forward direction; and switches SW6,28', SW7,29' and SW8,30' which connect respectively lines L3, L2 and L1 to points A, B, and C, upon activation of reverse coil 31' to provide reverse motor rotation.

The transformer 24 provides isolation of the pushbutton and pendant assembly 26 from the primary AC voltage lines L2 and L3. The transformer 24 may also step down the voltage from a primary side 32 to a secondary side 32'. An end 33 of primary 32 is connected to line L2 and an opposite end 34 is connected to line L3. One end 36 of the secondary 32' is connected to a point 37 in the contactor section 22 which is common to one end of the forward and reverse coils 31, 31', and the opposite end 38 of the secondary is connected to contacts 39, 40 of the forward and reverse pushbutton switches 27,27'.

Contact 41 of the forward-pushbutton switch SW1,27 is connected to end 42 of forward coil 31 and contact 43 of the reverse pushbutton switch SW2,27' is connected to end 44 of reverse coil 31'. When the forward switch SW1,27, is manually activated, points 39 and 41 connect together, causing the forward coil 31 to energize and in response the switches SW3,28, SW4,29 and SW5,30 close from their open positions (FIG. 3). When the reverse pushbutton switch SW2,27' is activated, points 40 and 43 connect together, causing the reverse coil 31' to energize and in response the switches SW6,28', SW7,29' and SW8,30' close from their open positions.

MOTOR

Figure 4:
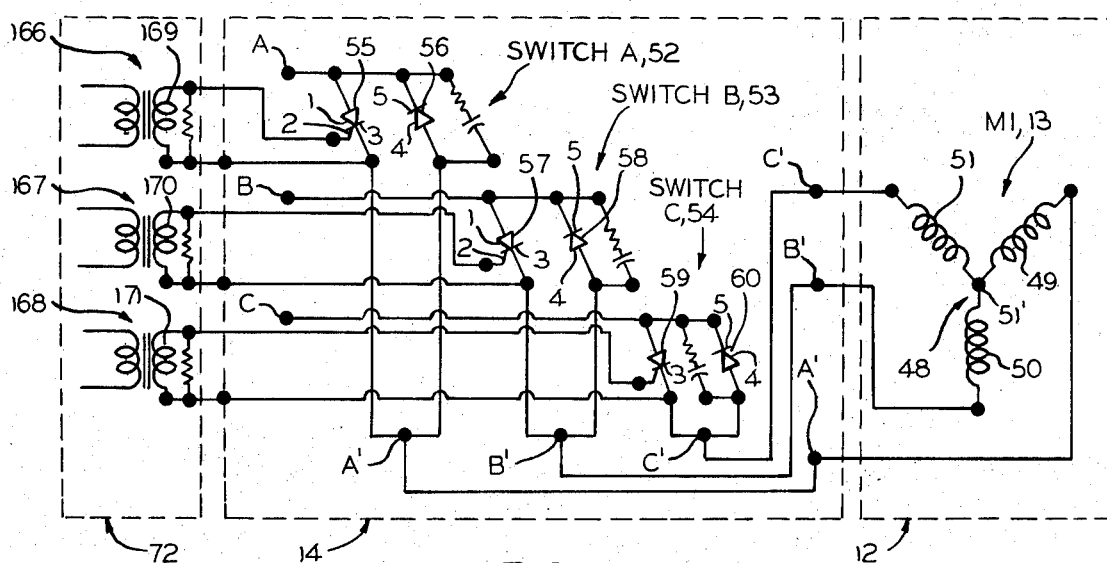
FIG. 4 is a schematic of the static switching network and associated output and input circuitry.

The motor means 12 comprises a stator 48 having three coils, 49, 50 and 51, for driving a rotor (not shown). As shown in FIG. 4, stator coils 49, 50 and 51 are connected together in a Y configuration at a junction point 51'. A delta configuration for the stator 48 would also be suitable.

The motor control system 10 provides forward and reverse phase rotation to the induction motor means 12. By phase controlling the voltage to the induction motor, increments of line power can be fed to the motor stator windings in order to slowly provide the energy required to reach the "break-away" torque of the system, prior to reaching full torque.

SWITCHING NETWORK

The switching network 14 (FIG. 4) comprises three static switches, 52,A, 53,B and 54,C. The sequence for switching the switches 52, 53 and 54 from an off-condition to a conduction-condition, determines the phase of the power appearing at output terminals A', B' and C' of the switching network 14 and thus determines the rotational direction of motor means 12. Although various types of static switches are suitable, a thyristor and diode combination in a back-to-back arrangement is used in the illustrated embodiment and described herein. An acceptable but most costly alternative is to use a pair of back-to-back thyristors. A thyristor is also commonly referred to as a silicon controlled rectifier (SCR).

Static switch A,52 includes thyristor 55 and diode 56 connected back-to-back between input terminal A and output terminal A'; static switch B,53 includes thyristor 57 and diode 58 connected between input terminals B and output terminal B'; and static switch C,54 includes thyristor 59 and diode 60 connected between input terminal C and output terminal C'. Terminals A', B' and C' are connected respectively to stator coils 49, 50 and 51. When the thyristor of the corresponding static switch is triggered "on," power from the corresponding power points A, B or C is connected to the corresponding output power points A', B' or C'. Since the static switches 52, 53 and 54 are connected to only one end of the Y stator coils 49, 50 and 51, system 10 is a half-wave AC motor control system. If, on the other hand, other static switches were also connected (in reverse manner) to the opposite end of each stator coil 49, 50 and 51, (shown in FIG. 4 tied together at the point 51'), system 10 would be a full wave system.

If lines L1, L2 and L3, upon activating the forward switch SW1,27 are connected respectively to points A', B' and C' via static switches 52, 53 and 54 (FIGS. 3 and 4), the motor means 12 moves in the forward direction; and if these lines are reversed by the reverse-pushbutton switch SW2,27', the motor means 12 moves in the reverse direction.

Only one thyristor switch may be turned "on" at any one time. When the thyristor 55 of static switch A,52 is fired into conduction, the positive portion of the sinusoidal current waveform passes from points A to A', then through stator coil 49 and stator coil 50 and/or stator coil 51, and finally returns to the AC power source via diodes 57 and/or diode 60, depending upon the voltage drop between the point A and points B and C during the conduction period of thyristor 55. Similarly, the current passes through thyristors 57 and 59 when these thyristors are in conduction. The negative portions of the input sinusoidal current waveforms turn the thyristors off.

OPERATIONAL CONTROL MEANS

Figure 6:
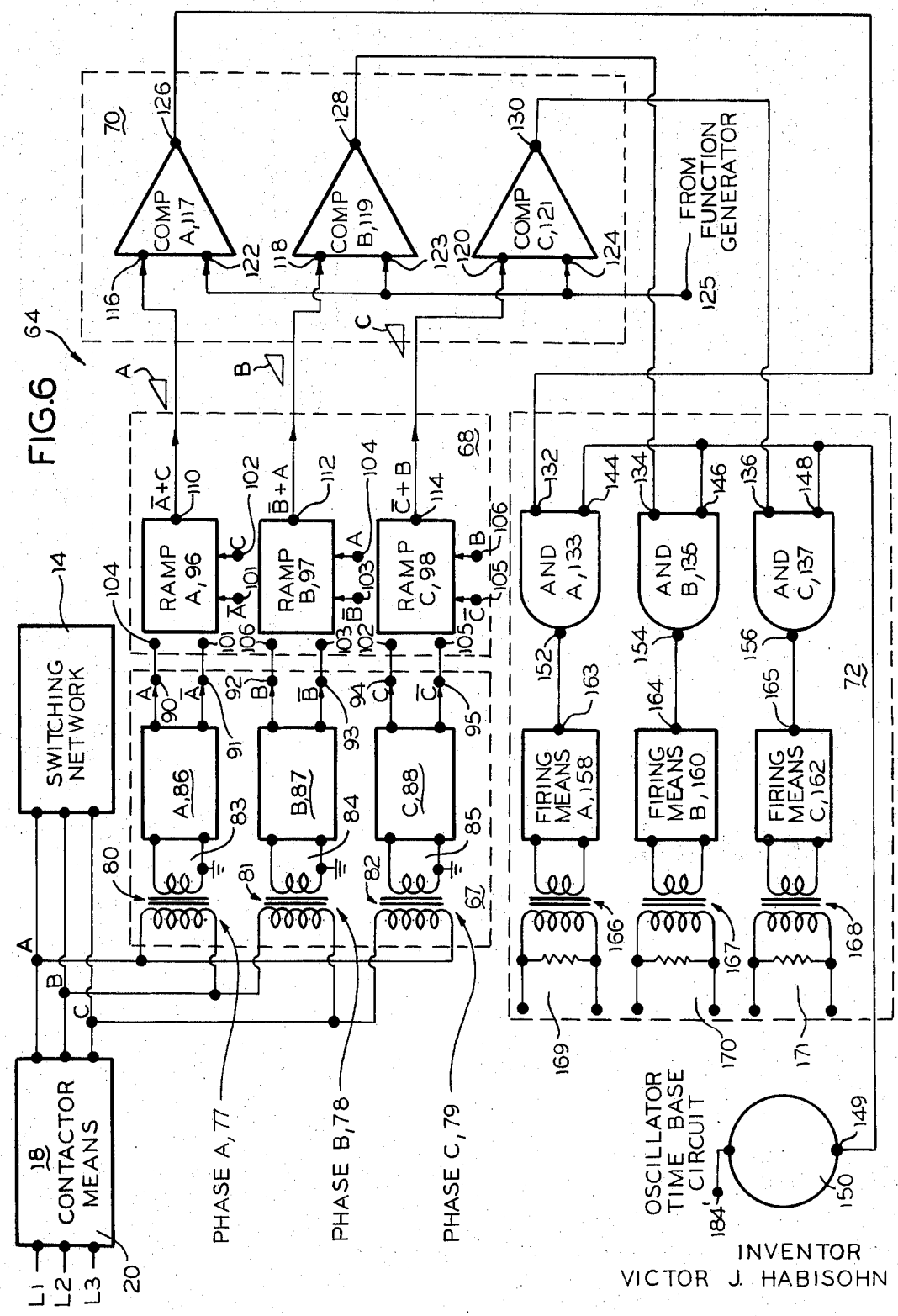
FIG. 6 is a more detailed block diagram of the thyristor firing circuit.
Figure 7:
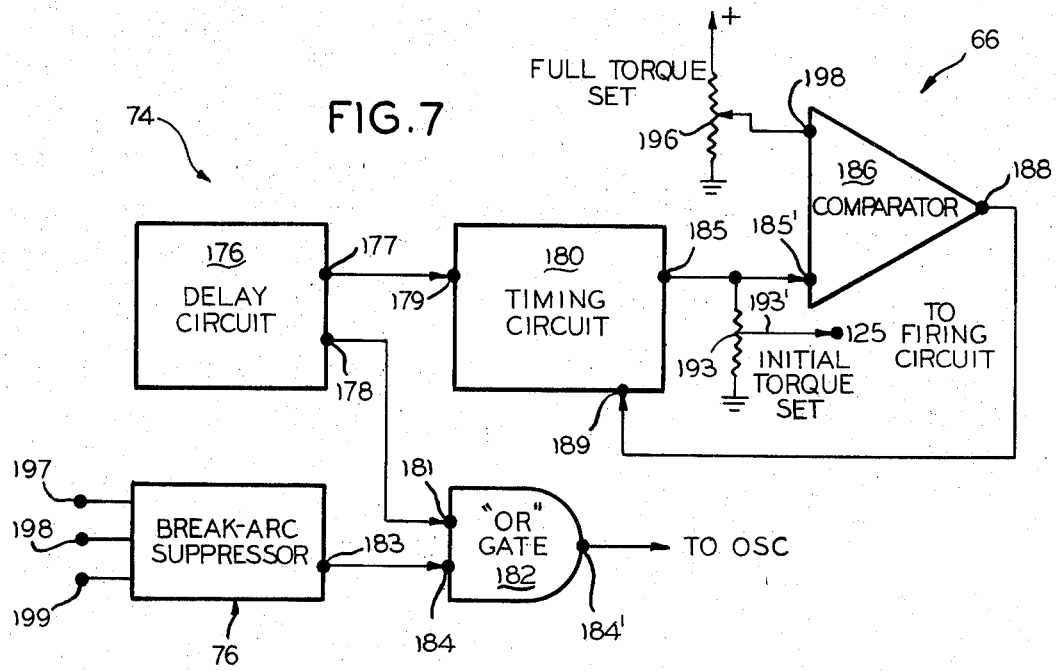
FIG. 7 is a block diagram of the function generator.
Figure 9:
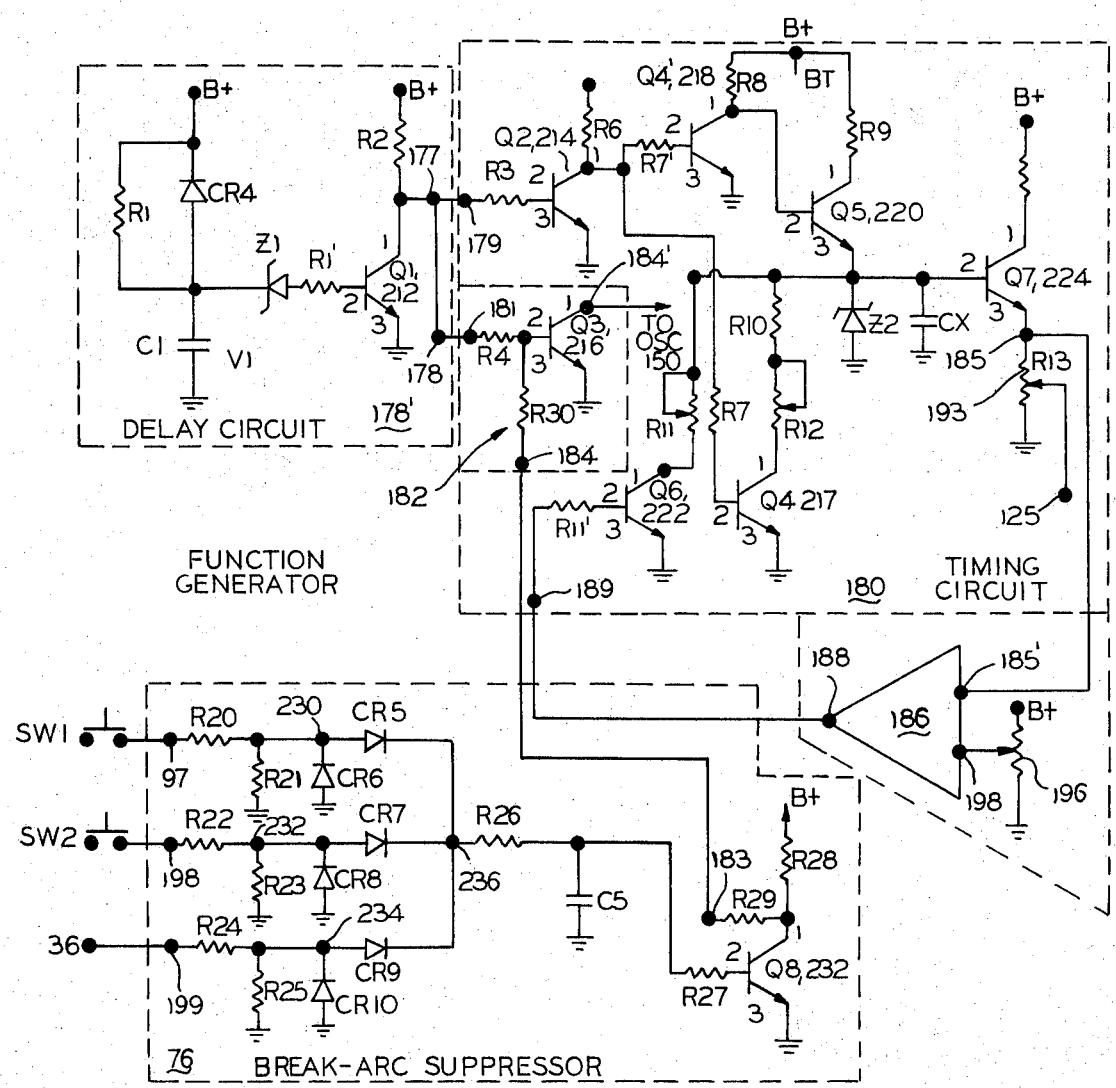
FIG. 9 is an electrical schematic of the function generator.

The operational control means 16 comprises a thyristor firing circuit 64 and an operational signal circuit 66 (FIGS. 2 and 5). The thyristor firing circuit 64 (FIG. 5) comprises a phasing network 67, a ramp network 68, a comparator network 70 and a firing network 72 (FIG. 6). The operational signal circuit 66 includes a function generator 74 and a break-arc suppressor means 76 (FIGS. 5, 7 and 9).

The function generator 74 generates the control signals, in particular the function signal shown in FIG. 8a, to provide the slow-start-stop feature of the system. Function generator 74 also includes means for suppressing electrical arcing when the AC electrical power is connected to the system. The break-arc suppressor means 76 includes means for suppressing electrical arcing when the AC electrical power is disconnected from the system.

PHASING NETWORK

The phasing network 67 comprises a phase means A,77; a phase means B,78; and a phase means C,79 (FIG. 6). Each phase means 77, 78 and 79 comprises respectively a step-down isolation transformer 80, 81 and 82. The primary of transformer 80 is connected to points A and B; the primary of transformer 81 is connected to points B and C and the primary of transformer 82 is connected to points C and A. The corresponding secondary 83, 84 and 85 of the transformers 80, 81 and 82 is connected respectively to a crossover detector network 86, 87 and 88.

The cross-over detectors 86, 87 and 88 are differential comparators, each comparing one of the phases of the alternating current line voltage (FIG. 10) with a ground signal and providing a square wave output for the positive portion of the AC voltage and a square wave output for the negative portion of the AC voltage. The positive portions of the three-phase power cycle consisting of phase A-B (phase A), phase B-C (phase B) and phase C-A (phase C) are referred to throughout the phasing network 67 respectively as A, B and C, and the negative portions of the phases are referred to respectively as A-NOT ($\bar{A}$), B-NOT ($\bar{B}$), and C-NOT ($\bar{C}$).

The square wave outputs at points 90 and 91 of phase means A,77 are respectively A and $\bar{A}$ (FIGS. 11a and 11b); the square wave outputs at points 92 and 93 of phase means B,78 are respectively B and $\bar{B}$ (FIGS. 11c and 11d); and square wave outputs at points 94 and 95 of phase means C,79 are respectively C and $\bar{C}$ (FIGS. 11e and 11f).

The square wave outputs of the phase means are referenced with respect to the corresponding sinusoidal inputs (FIG. 10) at the points A, B and C. If the phase of the inputs vary, the phase of the square wave outputs would vary responsively. Therefore, one set of phase relationships of the output of the phasing network 67 is generated when the forward switch SW1,27 is activated and another set when SW2,27 is activated. Thus, the voltages comprising the loop for points A, B and C are converted into reference square waves.

RAMP NETWORK

The ramp network 68 comprises a ramp gate A,96, a ramp gate B,97 and a ramp gate C,98. Outputs 91 and 94 ($\bar{A}$ and C) of phasing network 67 are connected respectively to inputs 101 and 102 of ramp gate A,96 (FIGS. 12a and 12b); the outputs 93 and 90 ($\bar{B}$ and A) are connected to inputs 103 and 104 of ramp gate B,97 (FIGS. 13a and 13b); and the outputs 95 and 92 ($\bar{C}$ and B) are connected to inputs 105 and 106 (FIGS. 14a and 14b). The output 110 of ramp gate A,96 is an inverted $\bar{A}$ + C sawtooth signal referred to as ramp A (FIGS. 12c and 15a); the output 112 of ramp gate B,97 is an inverted $\bar{B}$ + A sawtooth signal referred to as ramp B (FIGS. 13c and 15b) and the output 114 of ramp gate C,98 is an inverted $\bar{C}$ + B sawtooth signal referred to as ramp C (FIGS. 14c and 15c).

The ramp signals are 120° out of phase with respect to each other and the period of each ramp signal is 120°. Due to the phase variation of the ramp signals, only one thyristor of the switching network 14 at any specific time, is biased into the conduction-condition.

FIG. 10, for convenience of description, illustrates the three-phase input AC voltages at points A, B and C when the forward switch SW1 is activated to provide ABC phase rotation (clockwise voltage loop). If the phase A sine wave is selected as a reference, it will be seen that for the ABC phase rotation, Ramp A extends from 60° to 180° (FIG. 12c), Ramp B from 180° to 300° (FIG. 13C) and Ramp C (FIG. 14C) from 300° to 60°. Thus, during any 120° period only one thyristor could be fired.

Ramp A starts at the 60° point of the phase A voltage, Ramp B starts at the 60° point of phase B voltage and Ramp C starts at the 60° point of the phase C voltage. If the triggering of a thyristor switch occurs at the beginning of the ramp signal (60° point) current conducts for 180°, (current lags the voltage in induction motors by about 60°), until the negative portion of the current wave cuts off the thyristor switch. This is maximum energy transfer per phase current cycle. If, on the other hand, the firing of thyristor switch occurs near the end of the ramp signal (near 180°) current conducts for at least 60° until the negative portion of the current wave cuts off the thyristor. This is minimum energy transfer per phase current cycle. Full torque corresponds to maximum energy transfer per reference cycle, which depending upon the design parameters of system 10, may be a 180° conduction period per cycle. Energy transferred through the thyristor switch for a period less than maximum would correspond to the motor torque value, between time $t1$ and $t3$ in FIG. 8b, when the system is in its slow-start or slow-stop modes of operation.

When the phase of the input sine voltages are reversed by activating reverse switch SW2,27' to provide CBA phase rotation (counter-clockwise voltage loop), the phase relationship of the square wave outputs with respect to each other would vary correspondingly to reflect such sinusoidal phase reversal. Therefore, the phase of Ramp A (FIG. 15a), Ramp B (FIG. 15b) and Ramp C (FIG. 15c) would also vary in phase responsively to the variation of phase of the corresponding input square waves. However, each ramp function still remains 120° out of phase from each other and extends over a period of 120°. Therefore, the magnitude of energy transferred per cycle to each phase of the motor means is independent of the phasing of the input power at points A, B and C, but the sequence of firing of the thyristor switches is responsive to such phasing.

COMPARATOR NETWORK

The comparator network 70 comprises comparator A,117, comparator B,119 and comparator C,121 (FIGS. 5 and 6). Output 110 of ramp gate A,96 is connected to input 116 of comparator A,117; output 120 of ramp gate B,97 is connected to input 118 of comparator B,119; and output 114 of ramp gate C,98 is connected to input 120 of comparator C,121. Inputs 122, 123 and 124 are tied together and connected to output point 125 of the function generator 74 (FIGS. 7 and 9).

The comparators 117, 119 and 121 compare the corresponding ramp signals A, B and C with the function signal at point 125 which decreases in magnitude between time $t1$ and $t3$ (FIGS. 8a and 8b). Since each ramp signal is 120° out of phase from the other, only one ramp signal is being compared at one time and for a period of 120° per corresponding phase voltage cycle. If the function signal is greater than the corresponding ramp signal, no output signal appears at the corresponding comparator outputs 126 128 and 130. If the ramp signal is equal to or greater than the function signal, an output is generated. Therefore, when the function signal is at a maximum (time $t1$) the comparators provide output signals for the smallest time duration, and when the function signal is at or near zero, the comparators provide output signals for the longest time duration.

FIRING NETWORK

The outputs 126, 128 and 130 of the comparators 117, 119 and 121 are connected respectively to input 132 of AND gate A,133, input 134 of AND gate B,135 and input 136 of AND gate C,137 of the firing network 72 (FIGS. 5 and 6). The other inputs 144, 146 and 148 of AND gates 133, 135 and 137 are connected to an output 149 from an oscillator time base circuit 150. The oscillator 150 is cut-off when the break-arc suppressor means generates an inhibit signal or during the delay period $t0 - t1$ (FIGS. 8a and 8b) when the "-make" arc suppressor means generates an "inhibit" signal. When the oscillator 150 is cut-off, the AND gates do not generate output drive signals.

The outputs 153, 154 and 156 of AND gates 133, 135 and 137 provide a time series of pulses generated by oscillator 150 respectively for the firing means A,158, B,160 and C,162, after being switched from a normally off-condition to an on-condition. The outputs 152, 154 and 156 of the AND gates are connected respectively to inputs 163, 164 and 165 of the firing means 158, 160 and 162.

The firing means 158, 160 and 162 are connected respectively to pulse transformers 166, 167 and 168. These pulse transformers provide isolation between the main power lines L1, L2 and L3 and the rest of the system. As shown in FIG. 4, the secondary side 169, 170 and 171 of pulse transformers 166, 167 and 168 are connected respectively across the gate 2 and cathode 3 of thyristors 55, 57 and 59 of the switching network 14.

The firing means 158, 160 and 162 cause the corresponding thyristor switches to fire when AND gates 133, 135 and 137 are "on," and the thyristor switches are turned off by the negative portion of the corresponding alternating current phase current wave.

OPERATIONAL SIGNAL CIRCUIT

Referring now more specifically to FIGS. 5 and 7, the operational signal circuit includes the function generator means 74 and the break-arc suppressor means 76. The function generator means 74 comprises a delay circuit 176 having outputs 177 and 178 connected respectively to an input 179 of a timing circuit 180 and an input 181 of an "OR" gate 182. The output 183 of the break-arc suppressor means 76 is connected to input 184 of the OR gate 182.

The OR gate 182 functions as an inhibit firing circuit for the time base oscillator 150 (FIGS. 6 and 7). A "-make" signal from output 178 of the delay circuit 176 or a "break" signal from the output 183 of the break-arc suppressor means 76 generates an inhibit signal at the output 184' of OR gate 182 which turns "off" the time base oscillator 150. The "make" signal at output 178 is generated when the contactor means 18 connects electrical AC power into the system, and the "-break" signal at the output 183 of the break-arc suppressor 76 is generated when the contactor means 18 disconnects AC power from the system.

Output 185 of timing circuit 180 is connected to an input 185' of a comparator means 186. The output 188 of comparator 186 is fed back to an input 189 of the timing circuit 180. An initial torque adjustment means 193 is connected between the output 185 of the timing circuit and ground. The variable setting arm 193' is connected to output point 125 which is connected to comparators 117, 119 and 121 of firing circuit 64 (FIG. 6). Variation of the adjustment means 193 varies the magnitude of the functional signal (FIG. 8a) at output 125, and thereby provides the setting for initial torque of the motor means at substantially time $t1$.

A "full" torque adjustment means 196 is connected to input 198 of comparator 186 to provide a direct current (DC) reference voltage. The comparator means 186 generates an output signal only when the function signal voltage is equal to or less than the setting of the reference voltage at point 198. When this occurs, the amplitude of the function signal is decreased at an accelerated rate; which in effect determines the time full torque is reached. The output signal from comparator 186 occurs at time $t2$, and hence the variation of the setting of the full torque adjustment would correspondingly vary the time between $t1$ and $t2$ and the time between $t1$ and when full torque is reached.

Also, during the delay period ($t0$ to $t1$), the delay circuit 176 connects a "reset" pulse from the output 177 to the input 179 of the timing circuit 180 to reset the timing circuit to a start point, by fully recharging a timing capacitor CX (FIG. 9) prior to time $t1$. Hence, the time duration between $t1$ and $t2$ is substantially constant after each activation of the contactor means 18.

The break-arc suppressor means 76 (FIGS. 3 and 7) includes an input 197 from point 41 of the forward pushbutton switch SW1,27 (FIG. 3); an input 198 from point 43 of the reverse pushbutton switch SW1,27; and an input 199 from point 36 of the secondary 32' of transformer 24. The arc suppressor means 76 receives an AC signal upon activation of either manual switch SW1,27 or SW2,27', and generates an enable-signal at output 183. When switch 27 or 27' is released, the AC signal to the suppressor means 76 is instantly removed, but the forward line switches 28, 29 and 30 or reverse line switches 28', 29' and 30' remain closed for approximately 10 or 20 milliseconds after the corresponding manual switch is released. During this interval, the arc suppressor means 76 switches from the enable signal to the break signal at output point 183, causing the OR gate 182 to switch state and generate the inhibit signal to prevent oscillator 150 from firing; which in turn prevents the thyristor switches from firing into conduction.

FUNCTION GENERATOR MEANS

Referring now more specifically to FIGS. 7, 8 and 9, the function generator means 74 will now be described with greater detail. The function generator means 74 comprises the delay circuit 176, the timing circuit 180 and the "OR" gate 182.

The delay circuit 176 comprises a resistor R1 and a diode CR4 tied on one end to B+ and at the opposite end to a capacitor C1; the other end of C1 being grounded. A zener diode Z1 is connected between the junction of R1, CR4 and C1 and to the base 2 of a transistor Q1,212 via resistor R1'. The collector 1 of Q1 is tied to B+ via resistor R2, and the emitter 3 is grounded.

The B+ received from the power supply 21 automatically comes "on," after either the forward or reverse manual switches SW1,27, SW2,27' is activated and the corresponding line switches (FIG. 3) connect the power lines L1, L2 and L3 to power points A, B and C. Capacitor C1 charges toward the zener voltage V1 of zener diode Z1 during the delay period $t0 - t1$ (FIGS. 8a and 8b); and when the zener voltage V1 is reached, transistor Q1,212 is turned "on" and the voltage at the collector 1 drops to ground. This occurs at time $t1$, and is the instant that system 10 begins operating in its slow-start or slow-stop phase.

The collector 1 (points 177 and 178) of transistor Q1,212 is connected to point 179 and to the base 2 of transistor Q2,214 through resistor R3 and to point 181 and to the base 2 of transistor Q3,216 (OR gate 182) via resistor R4. The emitters 3 of transistors Q2 and Q3 are grounded. The collector 1 of Q3,216 (point 184') is connected to the input of the time base oscillator 150 (FIG. 6). The collector 1 of Q2,214 is connected to B+ via resistor R6, to the base of Q4,217 via resistor R7 and to the base of transistor Q4',218 via resistor R7'. The collector 1 of transistor Q4',218 is connected to B+ via resistor R8 and to the base 2 of transistor Q5,220. The emitter 3 of transistor Q5 is connected to zener diode Z2, capacitor CX, the base 2 of emitter follower transistor Q7,224, one end of variable resistor R10 and one end of variable resistor R11. The opposite end of variable resistor R10 is connected to the collector of transistor Q4,217. The opposite end of resistor R11 is connected to collector 1 of transistor Q6,222. The adjustment of variable resistor R10 primarily varies the rate of torque increase between time $t1$ to time $t2$ (FIGS. 8a and 8b) which in effect varies the slope of the function signal. The adjustment of variable resistor R11 primarily varies the rate of torque increase after time $t2$, which also varies the slop of the tail end of the function signal. Capacitor CX has a first discharge path comprising primarily variable resistor R10 and transistor Q4,217, and a second and substantially less resistive path comprising primarily variable resistor R11 and transistor Q6,222.

The base 2 of transistor Q6 is connected to point 189 via resistor R11' which is connected to output 188 of comparator 186. The initial torque adjustment means 193 is a variable resistor also referred to as R13 which is connected between emitter 3 of transistor Q7,224 (point 185) and ground.

During the delay period $t0$ to $t1$, transistor Q1,212 is cut-off which turns "on" transistors Q2,214 and Q3,216. When Q2,214 is "on", Q4,217 and Q4',218 are "off" and Q5,220 is "on." Prior to the end of the delay period, CX charges up to the zener voltage of zener diode Z2. Therefore, at the end of the delay period (time $t1$), the initial output voltage at point 125 (FIG. 9) would be substantially the same voltage for each slow-start or slow-stop mode of operation.

At time t1, transistor Q1,212 is turned "on" which causes transistors Q2,214 and Q3,216 to be "off"; Q4,217 and Q4',218 to be "on" and Q5,220 to be "off." Capacitor CX discharges primarily through resistor R10 and variable resistor R12 (rate adjust) and the voltage at the emitter 3 of the emitter following Q7,224 decreases in response thereto to provide a decreasing function signal at output 125.

When the voltage at input point 185' to comparator 186 (FIG. 7) at a time $t2$, drops below the voltage appearing at the other input 198, as determined by the full torque adjustment means 196, the signal generated at the output 188 causes transistor Q6,222 to turn "on," which in turn causes capacitor CX to more rapidly discharge through the less resistive path provided by variable resistor R11 and transistor Q6,222. Capacitor CX is fully discharged by the time t3 (FIG. 8) is reached. Thus, the rate of torque increase is accelerated after time $t2$, and full torque is reached at some point between $t2$ and $t3$. Therefore, the torque is increased at a first rate of acceleration and then at a second or greater rate of acceleration until finally reaching full torque. The period between $t1$ and $t2$ may be varied by the full torque adjustment means 196 or by the more precise rate adjust of R10. The period from $t2$ until full torque is reached may be varied by the setting of the full torque adjust 196 or more precisely varied by the setting of the rate adjust R11.

CONTACTOR "MAKE" ARC SUPPRESSOR

The thyristor switches are in the off-condition between time $t0$ to $t1$ due to the "make" signal appearing at the input 181 of the "OR" gate 182 from the delay circuit 176. In response OR gate 182 provides an inhibit signal which prevents oscillator 150 from generating any firing pulses. (FIGS. 7 and 9). Therefore, a high impedance appears across lines L1, L2 and L3 at the instant any of the forward or reverse line switches SW3, 4, 5, 6, 7 and 8 "make" contact with the lines L1, L2 and L3 and points A, B and C (FIG. 3). The effect of this is to suppress or prevent electrical arcing across the electro-mechanical line switches when initial contact is made. In this manner, the thyristor switches of the switching network 14 are protected from shorting out or damage due to high surge currents when the line switches "make" with the AC lines.

CONTACTOR "BREAK" ARC SUPPRESSOR

With more particular reference to FIGS. 3 and 9, the break-arc suppressor means will be described with greater detail.

Arc suppressor means 76 comprises a pair of rectifier diodes CR5, CR6 tied to the point 230 via a resistor divider R20, R21; a pair of rectifier diodes CR7, CR8 tied to point 232 via resistor divider R22, R23; and another pair of rectifier diodes CR9 and CR10 connected to point 234, via resistor divider R24 and R25. Points 230, 232 and 234 are connected respectively to points 41, 43 and 36 of contactor means 18 (FIG. 3). The anodes of diodes CR6, CR8 and CR10 are tied to ground and their cathodes are connected to the anodes of the corresponding diodes CR5, CR7 and CR9 of each pair. The cathodes of diodes CR5, CR7 and CR9 are tied together at a common junction point 236 and also to a resistor R26. A capacitor C5 is connected to resistor R26 and to the base 2 of transistor Q8,232 through resistor R27. The collector 1 of transistor Q8,232 is connected to B+ via resistor R28 and to output point 183 via resistor R29. Point 183 is connected to input 184, which is connected to base 2 of the OR gate 182 via resistor R30.

When either switch SW1 or SW2 is manually activated, the diode rectifiers (CR 5 to 10) rectify the AC voltage from the secondary of the transformer 24 to provide a DC bias voltage which turns transistor Q8 "on." When the switch SW1,27 or SW2,27' is initially released, the power supply 21 continues to provide B+ since the line contactor switches still make contact with the AC line due to the back electromotive force (EMF) in the corresponding coils 31 or 31'. However, since the bias voltage for transistor Q8 is no longer being developed, the voltage across capacitor C5 is instantly discharged and transistor Q8 turns "off." The voltage at collector 1 of transistor Q8 rises sharply and provides the "break" inhibit signal at input 184 of the "OR" gate 182, generating the disabling signal which biases the oscillator 150 "off." Thus, the disabling voltage prevents any firing voltages from being impressed across the thyristor switches of switching network 14, and consequently, all the thyristor switches are in their off-condition presenting a high impedance when the line switches finally break with the line. The effect of this is to suppress or prevent electrical arcing across the electromechanical line switches when contact with the power lines is severed. Therefore, the thyristor switches are protected from shorting out or damage due to high surge currents when the line switches "break" with the AC lines.

SYSTEM OPERATION

The control system 10 controls the energy transferred from the AC power source 19 to the motor means 12 when the motor means is started, stopped or its movement reversed. Upon activating the forward or reverse switches SW1 or SW2, the contactor means 18 first connects an AC voltage from the AC source to the input end 20 of the switching network 14. The DC power supply 21 then turns "on" causing the function generator means 74 to generate an inhibit signal and a reset signal for a delay time period from t0 to t1 (FIGS. 8a and 8b).

The inhibit signal prevents oscillator 150 from generating the pulses required for switching "on" the AND gates 133, 135 and 137 of the firing network 72 (FIG. 6); and consequently during the delay period the thyristor switches 52, 53 and 54 cannot be fired into conduction. By initially preventing firing of the thyristor switches, electrical arcing is suppressed or minimized when the line switches of the contactor means 18 connect the AC voltage into the system.

The reset signal enables the timing capacitor CX (FIG. 9) to be fully charged prior to time $t1$; and therefore, at every starting (or reverse plugging) the function signal (FIG. 8a) will begin from the same voltage level.

At time $t1$, the inhibit and reset signals are removed. The oscillator 150 begins generating the pulses which, after AND gates 133, 135 and 137 are switched in the on-condition, are coupled in a predetermined sequence, to the firing means 158, 160 and 162 and thereafter to the gates of the thyristor switches 52, 53 and 54.

The phasing network 67 converts the input AC phase A, phase B and phase C voltages into a first set of square waves representative of the positive portions of the input AC phase voltages and a second set of square waves representative of the negative portions of the input AC phase voltage.

The square waves are combined to provide three substantially identical linear "saw tooth" shaped ramp signals, Ramp A, Ramp B and Ramp C, each 120° out of phase from the other and extending for a period of 120°. The 120° period of each ramp signal A, B and C begins at the 60° point and ends at 180° respectively of the phase A, phase B and phase C input AC voltages. These relationships for the ramp signals remain the same for any combination of phasing of the balanced three-phase power lines L1, L2 and L3.

The ramp signals are each compared with the voltage decaying function signal of the function generator means 74. When the ramp signal A, B or C is equal or greater than the function signal, the corresponding comparator A,117, B,119 and C,121 generates a signal causing the corresponding AND gate 133, 135 or 137 to turn "on." The corresponding firing means 158, 160 or 162, in turn, applies a firing voltage between the gate and cathode of the corresponding thyristor switch 52, 53 and 54, causing it to switch into condition.

At time $t1$, the function signal is at its maximum and, depending upon the setting of the initial torque adjust 193, only a small part of the ramp signal should exceed the voltage of the function signal. Therefore, the corresponding thyristor switch will fire near the 180° point of the corresponding input AC phase voltage. However, since for an induction motor the current lags the voltage by approximately 60°, the current waveform will be at 120° when the voltage waveform is at 180°. Therefore, the minimum current conduction will be at least for a 60° period before the negative portion of current waveform turns the thyristor switch "off."

After the function signal has decayed to approximately zero, which is near time $t3$, the ramp signal causes the corresponding comparator to provide an output almost immediately after the beginning of the corresponding ramp signal period. Therefore, the corresponding thyristor switch will fire near the 60° point and current conduction will take place over a period of 180° until the negative portion of the current waveform turns the thyristor "off." Hence, when the function signal is at a maximum, minimum energy is transferred and the motor means operates at minimum speed and minimum or initial torque. When the function signal is at zero, maximum energy is transferred and the motor means operates at full speed and full torque.

Between time $t1$ and $t2$, the function signal decreases at a slow rate determined primarily by the discharge path of capacitor CX through variable resistor R10 (first rate adjust) and transistor Q4 (FIG. 9). Therefore, the magnitude of energy increments per input power cycle being transferred sequentially from the input to the output of the static switches between time $t1$ and $t2$ gradually increases, and the torque, in response, gradually increases. At time $t2$, the comparator 186 of the function generator means generates an output signal, which turns "on" transistor Q6 to provide a less resistive discharge path for capacitor CX through variable resistor R11 (second rate adjust), and transistor Q6. Therefore, the magnitude of energy increments per input power cycle transferred from the input to the output of the static switches more rapidly increases and the torque, in response, more rapidly increases until the "break away" torque condition is reached; and prior to time $t3$ the motor means operates at "full" torque and full speed.

To stop or reverse the direction of the rotation of motor means 12, the manual directional switch SW1 or SW2 is released and the reverse directional switch SW2 or SW1 is activated. The function generator means 74 operates in the same manner between time $t0$ and $t1$. At time $t1$, the ramp signals A, B and C cooperating with the function signal cause firing of the thyristor switches in a reverse sequence whereby a counter-torque is gradually built-up at substantially the same rate as the torque was initially built-up when first starting the system. At time $t2$, the rate of counter torque build-up is substantially increased and prior to reaching time t3, the counter-torque equals the torque and the motor means approaches substantially zero speed. If the manual switch is released, electrical power is disconnected and the motor means smoothly turns off. If the switch is not released and counter-torque is permitted to override the original directional torque, the system is immediately brought to full speed in the reverse direction. If this is not desirable, the manual switch should be momentarily released and then reactivated to enable the slow-start feature of the system to regulate the rise of speed and torque in the reverse direction.

At any time that either manual switches SW1 or SW2 is released the break-arc suppressor means 76 causes an inhibit signal to cut off oscillator 150 to prevent firing of the thyristor switches. When the line switches delayed in breaking from the power lines due to a back electro-motive force finally breaks with the AC power lines, all thyristor switches are "off."

The motor control system 10 is also adaptable to control a multiple speed motor having a plurality of stator windings corresponding to various "full" speeds of the motor means, that may be switched in and out of the stator circuit. A manual stator control switch (not shown) would be provided to switch, for example, from a lower full speed stator winding to a higher full speed stator winding. The higher full speed stator winding activates a lesser number of stator poles. When a greater number of stator poles are activated (low speed winding) the motor operates at the lower full speed and provides the same or a greater "full" torque. When less poles are activated (higher speed winding) the motor operates at the lower full speed and provides the same or a lesser "full" torque. The increase in speed from zero to the lower full speed would increase slowly, as shown in FIG. 8b in solid line. The increase in speed from the lower full speed to the higher full speed would also utilize the same slow-start feature of the system as shown in dotted line in FIG. 8b to slowly build up the speed and torque. This is done by discharging capacitor C1 in the delay circuit 176 and resetting the timing circuit 180 of the function generator means 74 at the instant the speed is increased.

If the speed is decreased from the higher full speed (the dotted curve in FIG. 8b) to the lower full speed by switching the stator control switch, capacitor C1 is again discharged to reset the timing circuit, and the speed, after the delay interval, slowly decreases as the counter-torque slowly increases during time $t1$ to $t3$ until the speed reaches the lower full speed. The reduction in speed from the lower full speed to zero is similarly accomplished by slowly applying counter-torque until zero speed is produced between the time $t1$ to $t3$.

When switching the speed of the motor means from the greater "full" speed to the lower "full" speed, the counter-torque is produced without reversing the phase of the input AC power. When reversing the motor direction, the contactor means 18 would be used for phase reversal which would also cause a slow decrease in speed by means of the slow-stop feature of the system building up the counter-torque in the reverse direction.

Although system 10 is illustrated and described as a three-phase AC power control system, it is easily adaptable to operate with a two-phase AC power source.

The system 10 may include a second contactor means (not shown) for connecting the thyristor switches of switching network 14 between the AC source 19 and the motor means 12 during the slow-start-stop operations of the system, and disconnecting the thyristor switches immediately after the motor means reaches full speed and simultaneously connecting the AC source directly to the motor means. By switching the thyristors in and out of the system, substantial and costly heat sinks for the thyristors would not be required.

The foregoing specification and description are intended as illustrative of the invention, the scope of which is defined in the following claims.

I claim:

1. In a motor control system including an alternating current (AC) voltage and current source, an AC motor means and an AC power control means, said power control means comprising:

a power switching network having an input end and an output end, said output end being coupled to said motor means, said power switching network transferring electrical power from the input end to the output end;

a voltage switch means for connecting AC voltage from the source to the input of said switching network;

an operational control means connected to said switching network, said operational control means after said voltage is connected to the input end of the switching network causing current conduction from said input end to the motor means to increase progressively from an initial time period during the first conducting cycle to a greater time period per cycle of said AC source current and thereby provide respectively an initial motor torque and a greater motor torque;

reference means for generating a reference signal during each cycle of said AC voltage when said current conduction is being progressively increased;

means for generating a voltage decaying function signal, the cooperation of said function signal with said reference signal causing said period of current conduction per cycle of AC source current to increase from the initial to the greater period per cycle;

means for delaying the generation of said function signal during a delay or first time interval after said voltage switch means connects said voltage from the source to the network, said current increasing from said initial to said greater period of current conduction during a second time interval; and means for resetting said function signal to an initial voltage level during said delay interval.

2. The control means of claim 1, wherein said operational control means includes means for decaying said function signal at a first rate during said second time interval and means for decaying said function signal at a second rate during a third time interval, said rate of decay during said third time interval being substantially greater than during said second time interval and thereby enabling the current conduction period per AC current cycle to more rapidly increase until said greater torque is reached.

3. In an alternating current (AC) energy switching system including an AC current and voltage source, a load means to receive energy from said source and an AC power control means, said power control means comprising:

a power switching network having an input end and an output end, said output end being operatively coupled to said load, said power switching network transferring power from the input end to the output end;

a voltage switch means having an input coupled to said AC source and an output for connecting said AC voltage from the source to the input of said switching network;

an operational control means connected to said switching network, said operational control means after said voltage is connected to the input end of the switching network, causing current conduction through the switching network to increase from an initial time period to a greater time period per cycle of said AC source current; and a direct current (DC) power supply having an AC input and a DC output, said AC input of the supply being coupled to the output of said voltage switch means and the DC output of the supply being connected to the operational control means.

4. An energy switching system for switching alternating current (AC) and voltage from an AC source to a load, comprising:

a power switching network including a plurality of solid state switches, each of the switches having an input and an output;

an electro-mechanical switch means including a line switch controlled by a manual switch having an on-position and an off-position, said line switch connecting and disconnecting the AC source from the input of said solid state switches when said manual switch is respectively in the on and off-positions;

a make-arc suppressor means for causing a first disabling signal to be generated for preventing current conduction through said switching network for a time delay interval after the electro-mechanical switch means connects said AC voltage to the input of the solid state switches; and a break-arc suppressor means for causing a second disabling signal to be generated for preventing current conduction through said solid state switch means prior to said line switch disconnecting said voltage after said manual switch is switched from the on to the off-position.

5. In a motor control system including a three-phase alternating current (AC) voltage and current source, said three-phase voltage including phase A voltage, phase B voltage and phase C voltage, an AC three-phase motor means and an AC three-phase power control means, said three-phase power control means comprising:

a power switching network including at least a first, a second and a third switch, each of said switches having an input and an output, said output being operatively connected to the motor means, said switches each having an on-condition and an off-condition;

a voltage switch means for connecting phase A voltage to the input of said first switch, phase B voltage to the input of said second switch, and phase C voltage to the input of said third switch; and an operational control means connected to said switching network, said operational control means after said phase A, phase B and phase C voltages are connected to the inputs of the switches causing the corresponding phase A, phase B and phase C current conduction to the motor means per cycle to increase from an initial time period to a greater time period, and thereby provide respectively an initial motor torque and a greater motor torque.

6. The three-phase power control means of claim 5, wherein said operational control means comprises:

reference means for generating a first reference signal, a second reference signal and a third reference signal; and function generating means for generating a function signal, the cooperation of said function signal with said first, second and third reference signals causing said period of current conduction per cycle of the AC phase A, phase B and phase C current to increase from the initial to the greater period.

7. The three-phase power control means of claim 6, wherein;

said voltage switch means is an electro-mechanical switch means having an on-condition and an off-condition for respectively connecting and disconnecting said phase A, B and C voltages respectively to said first, second and third switch means; and said first, second and third switches being solid state static switches, said operational control means including a "make" arc suppressor mean to cause a disabling signal to be generated for preventing current conduction through said static switch members for a predetermined time period after said electro-mechanical switch means has connected said phase A, B and C voltages to the inputs of said static switches.

8. The three-phase power control means of claim 7, wherein:
said electro-mechanical switch means includes a plurality of line switches controlled by a manual switch having an on-position and an off-position, said line switches connecting and disconnecting phase A, phase B and phase C voltages to the corresponding inputs of the static switches when said manual switch is respectively in the on-position and the off-position; and
said operational control means includes a break-arc suppressor means for causing a disabling signal to be generated prior to said line switches disconnecting said phase A, B and C voltages after said manual switch is switched from the on to the off-position, to prevent conduction of phase A, B and C current at the instant said line switch disconnects said phase voltages.

9. The power control means of claim 8, wherein said function generator means comprises:
a delay circuit to prevent phase A, B and C current conduction for a delay time interval after phase A, B and C voltages are connected to the corresponding static switches; and
a timing circuit including reset means for setting said function signal at an initial voltage level during said delay time interval and a first varying means for varying the voltage of said function signal from said initial level during the second predetermined time period, whereby the current conduction period through the first, second and third static switches increases with time per corresponding input phase A, phase B and phase C current cycle.

10. The power control means of claim 9 wherein said timing circuit includes second varying means for varying the voltage of said function signal during a third time interval, the rate of variation during said third interval being substantially greater than said second rate and thereby enabling the current conduction period for the first, second and third static switches to accelerate its rate of increase per corresponding input phase A, phase B and phase C current cycle until said greater torque is reached.

11. The power control means of claim 9 wherein each of the AC phase voltages is 120° out of phase from each other and said operational control means includes:
a phasing network having a first, second and third input for connecting respectively said phase A, B and C voltages, said phasing network generating square wave outputs corresponding respectively to the positive portions of the phase A, B and C voltages and square wave outputs corresponding to the negative portions of the phase A, B and C voltages;
a ramp network connected to the outputs of the phasing network to provide a ramp A signal generated during the phase A voltage cycle, a ramp B signal generated during the phase B voltage cycle, and a ramp C signal generated during the phase C voltage cycle; and a comparator network including a comparator A having a first input coupled to the output for said ramp A signal, a comparator B coupled to said ramp B signal and a comparator C coupled to said ramp C signal, each of said comparators including a second input connected to said function generator signal, each of said comparators A, B and C providing respectively an output drive signal A, B and C when the corresponding ramp signal A, B and C is greater than the function signal, whereby said output drive signals A, B and C causing respectively said first, second and third switches to switch from an off-condition to an on-condition to permit electrical power to be transferred from the input of the corresponding switch of the switching network to the motor means.

12. The power control means of claim 11 wherein:
the cooperation of said phasing network and ramp network causing each of said ramp signals A, B and C to begin at substantially the 60° point of the corresponding phase voltages A, B and C.

13. The power control means of claim 11 wherein the current in each of said phases lags the voltage by substantially 60°, and the cooperation of said phasing network and ramp network causing each of said ramp signals A, B and C to begin at substantially the 60° point and end at the 180° point of the corresponding phase voltages A, B and C, said thyristors being triggered into the on-condition between 60° and 180° of the corresponding phase voltage, so that the conduction period of each phase to said motor means is at least 60°.

14. The power control means of claim 11 wherein:
said first, second and third switches include respectively a first, second and third thyristor, each of said thyristors having an emitter, gate and collector whereby the output signals of comparators A, B and C cause a firing voltage to be applied to the gates respectively of said first, second and third thyristors, so that said thyristors fire into said on-conditioning, said thyristors switching from the on to the off-condition when the corresponding phase A, B and C phase currents reverse their polarities.

15. The power control means of claim 5, wherein said first, second and third switches each includes an on-condition and an off-condition, said operational control means includes:
a phase A means having an input connected to said phase A voltage, said phase A means having a first output for providing square wave signals corresponding to the positive polarity portions of the phase A voltage (A) and a second output for providing square wave signals corresponding to the negative polarity portions of the phase A voltage ($\overline{A}$);
a phase B means having an input connected to said phase B voltage, said phase B means having a first output for providing square wave signals corresponding to the positive polarity portions of the phase B voltage (B) and a second output for providing square wave outputs corresponding to the negative polarity portions of the phase B voltage ($\overline{B}$);
a phase C means having an input connected to said phase C voltage, said phase C means having a first output for providing square wave signals corresponding to the positive polarity portions of the phase C voltages (C) and a second output for providing square wave signals corresponding to the negative polarity portions of the phase C voltage ($\overline{C}$);

a ramp A gate means having a first input, a second input and an output, said first input being coupled to one of the outputs of the phase A means and said second input being coupled to one of the outputs of the phase C means, whereby one of said input signals to ramp A gate is representative of positive polarity portions and the other input is representative of negative polarity portions, said ramp gate means including means for converting said inputs to the A gate means to a ramp A signal at said ramp A output having a substantially 120° period per phase A voltage cycle;

a ramp B gate means having a first input, a second input and an output, said first input being coupled to one of the outputs of the phase B means and a second input coupled to the other of the outputs of the phase A means, whereby one of said input signals to ramp B gate is representative of positive polarity portions, said ramp B gate means including means for converting said inputs to the B gate means to a ramp B signal at the ramp B output having a substantially 120° period per phase B voltage cycle;

a ramp C gate means having a first input, a second input and an output, said first input being coupled to the other of the outputs of the phase C means and a second input being coupled to the other of the outputs of the phase B means whereby one of said input signals to ramp C gate is representative of positive polarity portions and the other input is representative of negative polarity portions, said ramp C gate means including means for converting said inputs to the ramp C gate means to a ramp C signal at the ramp C output having a substantially 120° period per phase C voltage cycle, said ramp A, B and C signals being reference signals for determining the point along the corresponding phase A, B and C voltage cycle said first, second and third switches respectively switch from the off to the on-condition.

16. The power control means of claim 15, wherein said operational control means includes:
function generator comprising means for generating a function signal decaying with time, said function signal appearing at an output of the generator;
a comparator A means having a first input coupled to the output of said ramp A gate means;
a comparator B means having a first input coupled to the output of the ramp B gate means;
a comparator C means having a first input coupled to the output of the ramp C gate means, the second inputs of each of said comparators being coupled to said output of the function generator means, said comparator A, B and C providing respectively an output signal A, B and C when the corresponding input ramp A, B and C signals exceed said function signal;
AND gate A having one input connected to the output of the comparator A;
AND gate B having one input connected to the output of comparator B;
AND gate C having one input connected to the output of comparator C;
an oscillator means for generating pulses at a substantially greater frequency than the frequency of the phase A, B and C voltage, said oscillator means having an output connected to a second input to said AND gates A, B and C, said AND gates A, B and C coupling said input oscillator pulses to the corresponding AND gate outputs when the corresponding said A, B and C signals from the comparators appear at said one input of the AND gates; and
coupling means for connecting the pulses at the output of AND gates A, B and C respectively to the first, second and third switches causing these switches to switch from an off to an on-condition.

17. The motor control system of claim 16 wherein lines A, B and C are connected respectively to said first, second and third switch, said phase A, B and C voltages being respectively the voltages between lines A and B, B and C, and C and A, said first and second inputs to ramp A gate being respectively $\overline{A}$ and C square waves, said first and second inputs to ramp B gate being respectively $\overline{B}$ and A, said first and second inputs to ramp C gate being respectively $\overline{C}$ and B.

18. The motor control system of claim 17 wherein the current corresponding to each of said phase voltages lags the voltage by substantially 60°, said ramp signals A, B and C beginning at substantially the 60° point and ending at substantially the 180° point of the corresponding phase voltages A, B and C, said first, second and third switches each including at least one thyristor, said ramp signal causing said thyristors to trigger into the on-condition between 60° and 120° of the corresponding phase voltage, so that the conduction period of each phase to said motor means is at least 60°.

19. The motor control system of claim 18 includes a break-arc suppressor means comprising means for generating a break-arc signal at its output prior to said voltage connecting means severing said AC voltages from said lines A, B and C, and said function generator means comprises:
a delay circuit including means for generating a delay signal for a delay time interval after said voltage connecting means connects AC voltage to lines A, B and C, said delay signal appearing at an output of said delay circuit;
a timing circuit including reset means for setting said function signal at an initial voltage level during said delay time interval, said function signal varying from said initial level during the second predetermined time period, whereby the current conduction period through the first, second and third static switches increases with time per corresponding input phase A, phase B and phase C current cycle; and
an OR gate including a first input, a second input and an output, said first input being connected to the output of the delay circuit, said second input being connected to the output of the break-arc suppressor means, said output of the OR gate being connected to an input of said oscillator means, said OR gate generating an inhibit signal at its output in response to either said delay signal or said break-arc signal, said inhibit signal preventing operation of said oscillator and thereby preventing said thyristors from firing from the off-condition to the on-condition.

20. The power control means of claim 19 includes a comparator means having a first input connected to a reference voltage, a second input connected to said function generator, and an output also connected to said function generator, the signal at said second input varying in magnitude in response to the voltage variation of said function signal, said comparator means providing an output when the signal at said second input reaches a predetermined level in comparison with said reference voltage to cause an increase in the rate of decay of said function signal.

21. The power control means of claim 5, wherein said first, second and third switches of the switching network each includes a thyristor having a cathode, gate and anode, whereby the phase A current flows through the thyristor of the first switch from the source to the motor means and return to the source via a diode of at least one of the other switches.

22. The motor control system of claim 5, wherein said motor means includes:
   a first stator winding to provide a first "full" speed and a second stator winding to provide a second "full" speed greater than said first full speed;
   static switch means for switching either said first and second stator windings into the stator circuit of the motor means; and
   means cooperating with the stator switch means to activate said operational control means whereby the phase A, B and C current conduction to the motor means per cycle increases from said initial time period to said greater time period after the stator switch means switches from said first to the second winding, said greater period of conduction enabling said motor to operate at said second full speed.

23. The motor control system of claim 5 wherein said greater torque is full torque of the motor means and includes a contactor means for switching said first, second and third switches out of the circuit and connecting said phase A, B and C voltages to said motor means, when said motor means reaches full torque.

24. In a motor control system including an alternating current (AC) voltage and current source, an AC motor means and an AC power control means, said power control means comprising:
   a power switching network having an input end and an output end, said output end being coupled to said motor means, said power switching network transferring electrical power from the input end to the output end;
   an electro-mechanical switch means including a line switch controlled by a manual switch, said manual switch having an on-position and an off-position, said line switch connecting and disconnecting said AC voltage when said manual switch is respectively in the on and off-position;
   an operational control means connected to said switching network, said operational control means after said voltage is connected to the input end of the switching network causing current conduction from said input end to the motor means to increase from an initial time period to a maximum time period per cycle of said AC current and thereby provide respectively an initial motor torque and a full motor torque; and
   a break-arc suppressor means to cause a disabling signal to be generated after said manual switch is switched from the on-position to the off-position, for preventing said switching network from transferring said electrical power prior to said line switch disconnecting said AC voltage.

25. In a motor control system including an alternating current (AC) voltage and current source, an AC motor means and an AC power control means, said power control means comprising:
   a power switching network having an input end and an output end, said output end being coupled to said motor means, said network including a plurality of static switches, each of the static switches having an off-condition and an on-condition, said static switching transfering electrical power from the input end to the output end when in said on-condition;
   a voltage switch means for connecting AC voltage from the source to the input of the switching network in a first direction and in a second direction;
   a phasing network having a plurality of input voltages corresponding to the voltages in a loop of a source AC voltages, said phasing network being connected to the input end of the switching network, the output of said phasing network being a plurality of square wave voltages, one set of square wave outputs corresponding to the positive portions of said input AC voltages and a second set of square wave outputs corresponding to the negative portions of the said input AC voltages; and
   a ramp gate network connected to the output of the phasing network to provide a plurality of ramp signals of like number as the input voltages to the phasing network, whereby only one of the ramp signals is being generated at any one instant, when said voltage switch means is connected in either of said directions, each ramp signal corresponding to a different one of said static switches and cooperating with other signal means to switch said static switches into conduction.

26. In an alternating current (AC) energy switching system including an AC current and voltage source, a load means to receive energy from said source, a power control means for controlling the energy transferred from the source to the load and a voltage switching means for connecting the voltage from the source to the power control means in one polarity or in a reverse polarity, said power control means comprising:
   a power switching network having an input end for coupling said voltage switching means thereto and an output end for coupling said load thereto, said switching network including at least two switch means for providing current flow from the input end to the output end in one direction or in a reverse direction, each of said switch means including an on-condition and an off-condition;
   means for cooperating with said voltage switching means to enable said voltage switching means to switch the voltage to the switching network from said one polarity to said reverse polarity and thereby cause said current flowing in said one direction to flow in the reverse direction; and an operational means connected to the switching network, said operational means including turn-on means for switching one of said switch means to the on-condition from the off-condition during each cycle of said AC current when the other of said switch means is in the off-condition, said turn-on means including means for increasing the period of current conduction through said one and said other switch means for each said cycle of AC current from an initial period to a maximum period.

27. A method for controlling the operation of a motor means between zero and full torque, comprising the steps of:
connecting alternating current (AC) voltage to a power control means;
preventing current conduction through the power control means for a delay period after the connection of the AC voltage;
increasing current conduction per cycle to the motor means at a first rate of increase until the motor means reaches a predetermined speed; and
increasing current conduction per cycle to the motor means at a second rate of increase until said full motor torque is reached, said second rate being greater than the first rate.

28. A method for transfer of electrical energy to a load including the steps of:
connecting alternating current (AC) voltage to at least two static switch means when said switch means are in a nonconducting condition whereby no electrical current flows to said motor means;
delaying current conduction through said switch means for a delay period after said AC voltage is connected to the input of the network;
causing current conduction through one of said switch means after said delay period to enable a portion of current of one AC current cycle to flow to said load via said one switch means during a first time period;
stopping current conduction through said one switch means and causing current conduction through the other said switch means to enable a second portion of current to flow to said load via said other switch means during a second time period; and
increasing the magnitude of the period of current conduction to said load in comparison with the magnitude of current conduction during the previous period until the magnitude of energy supplied to said load reaches a predetermined level.

29. A method for transfer of electrical energy to a load including the steps of:
connecting alternating current (AC) voltage to an input of a power switching network, said load being coupled to the output of the power switching network;
delaying current conduction through said switching network for a delay period after said AC voltage is connected to the input of the network;
increasing current conduction to the load after said delay period from an initial period to a greater period per AC current cycle and thereby increasing the energy supplied to the load; and
applying a disabling signal to prevent current conduction through the switching network prior to disconnecting the AC voltage from the input of the power switching network.

30. In a power control system for controlling the transfer of alternating current (AC) voltage and current from an AC source to a load, said control system comprising:
a power switching network having an input end and an output end for coupling the load thereto, said switching network including at least a first switch means and a second switch means for providing current conduction from the input end to the output end, each of said switch means having an on-condition and an off-condition;
an operational means to progressively increase said current conduction per cycle of AC current from an initial time period to a greater time period and thereby provide respectively an initial current conduction and a greater current conduction per AC current cycle; and
voltage switch means having an on-position and an off-position for respectively connecting and disconnecting said AC voltage from the input of the power switching network, said voltage switch means including means for generating a turn-on signal when switched from the off to the on-position to cause the starting of said current conduction.

31. The control system of claim 30, wherein each of said switch means includes a unidirectional device, said unidirectional device of one of said switch means providing a return path to said AC source for said current when the other of said switch means is in the on-condition, said voltage switch means including means for generating a turn-off signal when switched from on to the off-position to stop current flow through said power switching network.

32. The control system of claim 31 wherein each of said switch means includes a thyristor means in parallel with a diode means, each said thyristor means having said on-condition and said off-condition, the thyristor of one of said switch means when in the on-condition enabling said current to flow from said source to said load and the diode of the other of said switch means providing a return path for said current from the load to the source.

33. The control means of claim 30 wherein said voltage switch means includes:
a forward switch means and a reverse switch means for connecting said AC voltage respectively in the forward and reverse directions, said forward and reverse switches each including an on-position and an off-position, said turn-on signal being generated when either said forward and reverse switches are switched from the off to the on-position.

34. In a power control system for controlling the transfer of alternating current (AC) voltage and current from an AC source to a load, said control system comprising:
a power switching network having an input end for coupling said AC source thereto and an output end for coupling said load thereto, said switching network including at least two switch means for providing current flow from the input end to the output end, each of said switch means having an on-condition and an off-condition;
turn-on means for switching one of said switch means to the on-condition from the off-condition during each cycle of said AC current when the other of said switch means is in the off-condition;

reference means for generating a reference signal during each cycle of said AC voltage; and function generator means for generating a voltage decaying function signal, the cooperation of said function signal with said reference signal causing said period of current conduction to increase per cycle from an initial period of current conduction to a greater period of current conduction.

35. A method for controlling the operation of a motor means comprising:

switching a voltage switch means from an off to an on-condition for connecting alternating current (AC) voltage from a source to at least two switch members when said switch members are in an open-condition whereby no electrical current flows to said motor means;

generating a turn-on signal when switching said voltage switch means; and progressively increasing the magnitude of the period of current conduction per cycle through each of said switch members in comparison with the magnitude of the period of current conduction during the previous cycle until said motor means operates near "full" torque, after said turn-on signal is generated.

36. A method for controlling the operation of a motor means comprising:

connecting alternating current (AC) voltage to at least two switch means, when said switch means are in an open-condition whereby no electrical current flows to said motor means;

closing one of said switch means to enable a portion of one AC current cycle to flow to said motor means via said one switch means during a first time period;

opening said one switch means and closing the other switch means during said current cycle to cause a second portion of current to flow to said motor means via said second switch means during a second time period;

closing said one switch means and opening said other switch means during a second and successive current cycles;

gradually increasing the magnitude of the period of current conduction to said motor means in comparison with the magnitude of the period of current conduction during the previous period until said motor means reaches a predetermined greater motor torque;

changing the phase relationship of said alternating current (AC) voltage when said motor means operates at said greater torque for changing the rotation of the motor means from a first direction to a second direction; and preventing current conduction for a delay period after changing said phase relationship.

* * * * *